(12) United States Patent
Caliskan et al.

(10) Patent No.: US 9,771,110 B2
(45) Date of Patent: Sep. 26, 2017

(54) METHOD OF ENHANCING IN-SERVICE STRUCTURAL PERFORMANCE OF A SHEET METAL COMPONENT

(71) Applicant: FORD GLOBAL TECHNOLOGIES, LLC, Dearborn, MI (US)

(72) Inventors: Ari Garo Caliskan, Canton, MI (US); Jo Ann Clarke, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/716,003

(22) Filed: May 19, 2015

(65) Prior Publication Data

US 2016/0339965 A1    Nov. 24, 2016

(51) Int. Cl.
   *B62D 29/00*    (2006.01)
   *B62D 25/06*    (2006.01)
   *C22F 1/05*    (2006.01)

(52) U.S. Cl.
   CPC .......... *B62D 29/008* (2013.01); *B62D 25/06* (2013.01); *C22F 1/05* (2013.01)

(58) Field of Classification Search
   CPC .......... B62D 29/008; B62D 25/06; C22F 1/05
   USPC ....................................................... 296/210
   See application file for complete search history.

(56) References Cited

U.S. PATENT DOCUMENTS

| 6,820,924 | B2 | 11/2004 | Caliskan et al. |
| 7,461,874 | B2 | 12/2008 | Guiles et al. |
| 7,618,503 | B2 * | 11/2009 | McCrink .................. C21D 1/42 148/605 |
| 7,828,357 | B2 * | 11/2010 | Hayashi ................ B23K 11/115 296/29 |
| 8,211,251 | B2 | 7/2012 | Carsley et al. |
| 8,448,324 | B2 * | 5/2013 | Berger .................. B29C 70/845 29/521 |
| 2014/0125090 | A1 | 5/2014 | Braunschweig |

FOREIGN PATENT DOCUMENTS

DE    102011118285 A1    8/2012
EP    0818361 A1    1/1998

* cited by examiner

*Primary Examiner* — Joseph D Pape
*Assistant Examiner* — Dana Ivey
(74) *Attorney, Agent, or Firm* — Damian Porcari; King & Schickli, PLLC

(57) ABSTRACT

A method is provided for enhancing in-service structural performance of a sheet metal component incorporating a discontinuity. The method comprises heat-treating a zone of the sheet metal component a predetermined distance from the discontinuity thereby changing the strength and ductility of the zone and shifting the deformation induced in the sheet metal component by a subsequent deformation event away from the discontinuity to the zone.

15 Claims, 3 Drawing Sheets

METHOD OF ENHANCING IN-SERVICE STRUCTURAL PERFORMANCE OF A SHEET METAL COMPONENT

TECHNICAL FIELD

This document relates generally to the heat-treatment of sheet metal components including, more particularly, sheet metal components utilized in the production of motor vehicles such as motor vehicle roof panels, hang-on panels, or other body panels.

BACKGROUND

The presence of discontinuities such as, for example, a weld, a weld heat-affected zone, a feature line, a feature bend, a mechanical fastener joint, a gauge change or a deep draw area that underwent mechanical deformation during manufacture, can negatively impact the structural performance of components and assemblies including, particularly, sheet metal components used in the production of motor vehicles. This is particularly true when those sheet metal components are made from work-hardened and/or heat-treated aluminum alloys.

More specifically, the strength and/or ductility of a weld and a weld heat-affected zone are almost always reduced below that of the parent substrate for aluminum alloys. In addition, the geometry of the welded joint may introduce a stress concentration that can lead to cracking under service conditions as well as during impact loading. Further, welds in aluminum alloys generally demonstrate lower load-bearing capability when exposed to peel loading rather than pure tensile shear.

Thin gauge, heat-treated 6XXX aluminum alloys such as those commonly used for automotive body panels are particularly susceptible to these issues. FIGS. 1a and 1b show such an aluminum roof panel R joined to a door opening panel D by a weld joint W. When subjected to a sufficient impact load from, for example, a vehicle accident, the aluminum roof panel R could buckle adjacent the weld W causing a load concentration at the weld operating in peel mode. See FIG. 1c. In extreme conditions this could result in the failure of the weld.

This document relates to (a) a method of enhancing in-service structural performance of a sheet metal component incorporating a discontinuity including, for example, a metal motor vehicle roof panel as well as to (b) such a roof panel heat-treated to overcome the potential problem.

SUMMARY

In accordance with the purposes and benefits described herein, a method is provided for enhancing in-service structural performance of a sheet metal component incorporating a discontinuity. That method comprises heat-treating a zone of the sheet metal component a predetermined distance from the discontinuity thereby changing the strength and ductility of the heat-treated zone. Further, the method includes shifting deformation induced in the sheet metal component by a subsequent deformation event away from the discontinuity to the zone.

In one possible embodiment, the method further includes reducing strength and increasing ductility of the zone. In one possible embodiment, the method includes reducing the strength of the material in the zone by 15% to 25%.

In yet another possible embodiment, the sheet metal component is a 6XXX aluminum alloy and the method further includes heating the zone of the sheet metal component to a temperature of between 426° C. and 482° C. for between 0.05 and 1 seconds.

In one possible embodiment, the method further includes controlling heat input into the zone during heat-treating using a combination of laser power, laser beam size and configuration, and laser travel speed. Still further, in one possible embodiment, wherein the discontinuity in the sheet metal component is a weld seam, the method further includes shifting deformation mode thereby causing the weld seam to be loaded in shear instead of peel.

In accordance with an additional aspect, a method is provided for enhancing in-service structural performance of a metal motor vehicle roof panel incorporating a discontinuity. That method may be broadly described as comprising the steps of heat-treating a zone of the metal motor vehicle roof panel a predetermined distance from the discontinuity thereby changing the strength and ductility of the zone and shifting deformation induced in the metal motor vehicle roof panel by a subsequent deformation event away from the discontinuity to the zone.

In accordance with still another aspect, a roof panel is provided for a motor vehicle. That roof panel comprises a sheet metal component including a discontinuity and a heat-treated zone a predetermined distance from the discontinuity. The heat-treated zone is characterized by a reduced strength and an increased ductility whereby deformation induced in the sheet metal component by a subsequent deformation event is shifted away from the discontinuity to the zone. In one possible embodiment, the material comprising the roof panel zone has undergone a reduction in strength of between 15% and 25%.

In one possible embodiment, the discontinuity is selected from a group of discontinuities consisting of a weld, a weld heat-affected zone, a feature line, a feature bend, a mechanical fastener joint, a gauge change and a deep draw area that underwent mechanical deformation during manufacture.

In one possible embodiment, the discontinuity is a weld seam between the roof panel and a door opening panel. That weld seam runs along a margin of the sheet metal component. In such an embodiment the zone runs parallel to the weld seam. More specifically the zone may be spaced from the weld seam a distance of between 1 cm and 30 cm. Further, the zone has a width of between 2 mm and 100 mm. Still further, the zone runs the full length of the weld seam.

In accordance with an additional aspect, a method is provided for enhancing in-service structural performance of a metal motor vehicle hang-on panel or other body panel incorporating a discontinuity. That method may be broadly described as comprising the steps of heat-treating a zone of the metal motor vehicle body panel a predetermined distance from the discontinuity thereby changing the strength and ductility of the zone and shifting deformation induced in the metal motor vehicle body panel by a subsequent deformation event away from the discontinuity to the zone. In accordance with an additional aspect, a method is provided for enhancing in-service structural performance of a metal motor vehicle body panel incorporating a discontinuity. That method may be broadly described as comprising the steps of heat-treating a zone of the metal motor vehicle body panel a predetermined distance from the discontinuity thereby changing the strength and ductility of the zone and shifting deformation induced in the metal motor vehicle body panel by a subsequent deformation event away from the discontinuity to the zone.

In the following description, there are shown and described several preferred embodiments of the method and the roof panel processed by the method. As it should be realized, the method and the roof panel are capable of other, different embodiments and their several details are capable of modification in various, obvious aspects all without departing from the method and roof panel as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the method, the sheet metal component and the roof panel and together with the description serve to explain certain principles thereof. In the drawing figures.

Reference will now be made in detail to the present preferred embodiments of the method and the roof panel, examples of which are illustrated in the accompanying drawing figures.

DETAILED DESCRIPTION

Figure 2A:
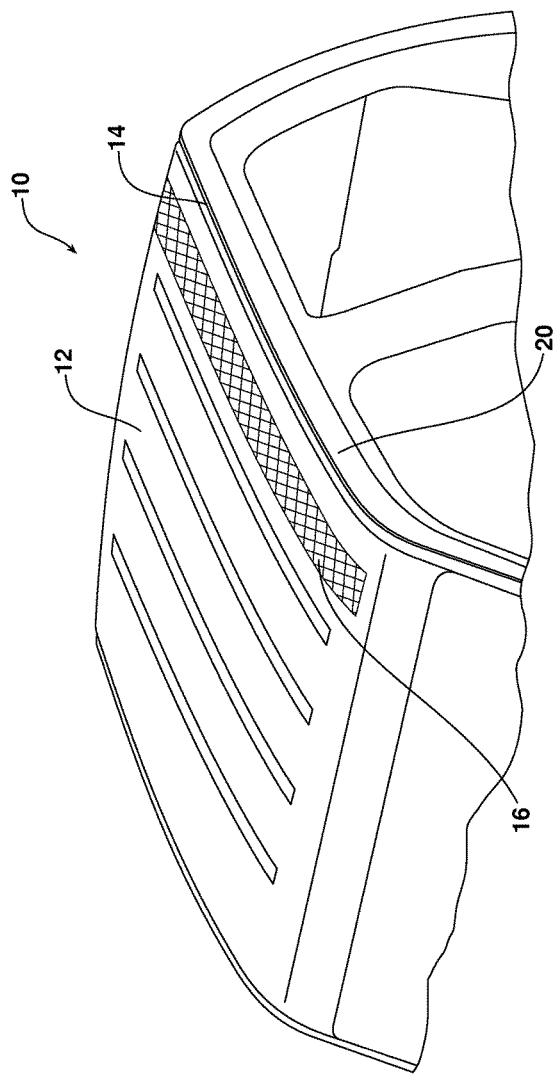
FIG. 2a is a perspective view of a roof panel illustrating the positioning of a heat-treatment zone adjacent the weld seam discontinuity that enhances the in-service structural performance of the roof panel in accordance with the teachings of this document.
Figure 2B:
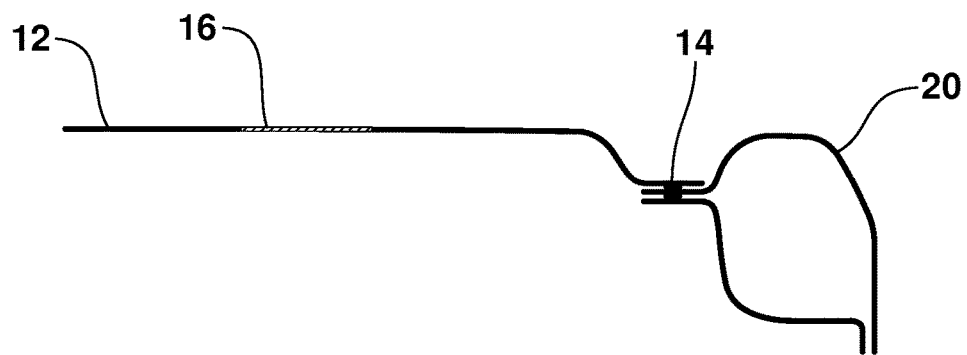
FIG. 2b is a cross-sectional view along line A-A of FIG. 2a illustrating the heat-treated roof panel, and the door opening panel to which the roof panel is connected by means of the weld seam or joint.
Figure 2C:
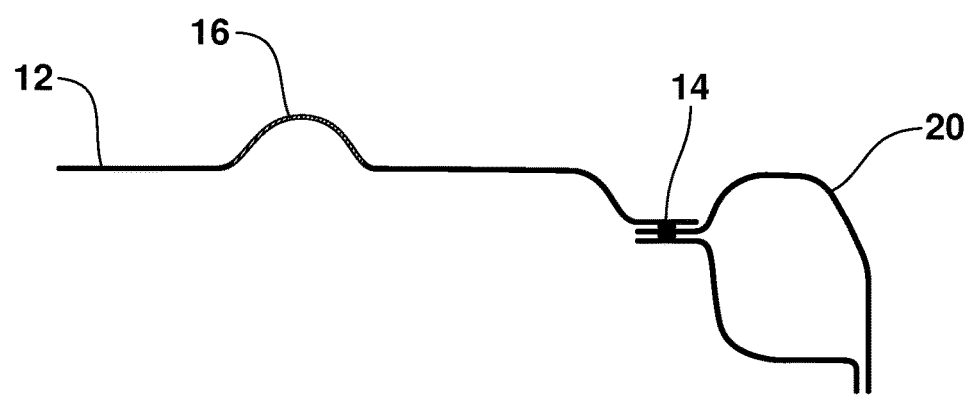
FIG. 2c is a view similar to FIG. 2b but illustrating the cross section following a deformation event showing how the roof panel buckles in the heat-treated zone away from the weld seam or joint to thereby protect the integrity of that weld seam.

Reference is now made to FIGS. 2a-2c illustrating a motor vehicle roof panel 10 that has been subjected to a method of enhancing in-service structural performance. More specifically, the motor vehicle roof panel 10 comprises a sheet metal component 12 including a discontinuity 14 and a heat-treated zone 16.

In the illustrated embodiment, the discontinuity comprises a weld seam or joint 14 between the roof panel 10 and a door opening panel 20 that runs along a margin of the sheet metal component 12. As illustrated, the heat-treated zone 16 runs parallel to the weld seam 14. In one possible embodiment, the heat-treated zone 16 is spaced from the weld seam 14 a distance of between 1 cm and 30 cm. Further, the heat-treated zone 16 has a width of between 2 mm and 100 mm. Still further, the zone 16 runs the full length of the weld seam 14.

As should be readily understood, the motor vehicle roof panel 10 that is the subject matter of this document has been subjected to a method of enhancing in-service structural performance of a sheet metal component 12 wherein that sheet metal component incorporates a discontinuity such as the weld seam 14. Here it should be appreciated that the weld seam 14 is merely one example of a discontinuity. Other examples include but are not necessarily limited to a weld heat-affected zone or area, a feature line, a feature bend, a mechanical fastener joint, a gauge change and a deep draw area that underwent mechanical deformation during manufacture and, as a consequence, has been hardened or become more brittle.

That method comprises heat-treating the zone 16 of the sheet metal component 12 a predetermined distance from the discontinuity/weld seam 14 and thereby changing the strength and ductility of the zone. As will be described in greater detail below, the method also includes shifting deformation induced in the sheet metal component 12 by a subsequent deformation event away from the discontinuity/weld zone 14 to the zone 16.

In one particularly useful embodiment, that method includes reducing the strength and increasing the ductility of the zone 16 through the heat-treatment. In another possible embodiment, where appropriate, the strength of the zone may be increased and the ductility reduced if desired. In other possible embodiments, multiple zones may be provided in order to enhance the in-service structural performance of the sheet metal component 12 in a desired manner.

In one particularly useful embodiment, the material comprising the zone 16 undergoes a reduction in strength of between 15% and 25% as a result of the heat-treatment. Where the sheet metal component 12 is a 6XXX aluminum alloy, the method may include heating the zone of the sheet metal component to a temperature of between 426° C. and 482° C. for a sufficient amount of time (e.g. 0.05 to 1 seconds) to provide a reduction in the strength of the material in the zone of 15% to 25%.

In one possible embodiment, the heat-treatment is performed by means of a laser and the amount of heat put into the zone 16 during heat-treatment is controlled using a combination of laser power, laser beam size and configuration, and laser travel speed. In another possible embodiment, heat-treatment is performed by induction.

Figure 1A:
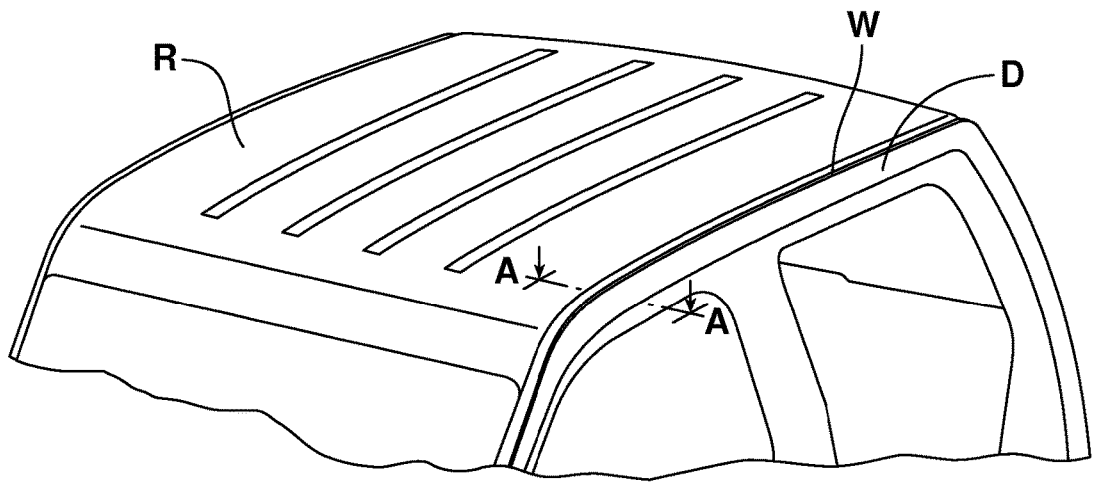
FIG. 1a is a view of a prior art untreated roof panel and a cooperating door opening panel to which the roof panel is joined by means of a weld seam.
Figure 1B:
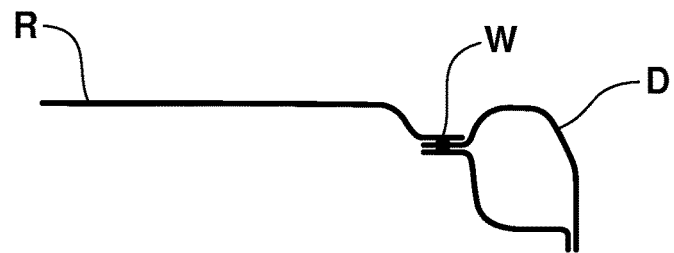
FIG. 1b is a cross-sectional view through line A-A showing the weld seam or joint between the prior art roof panel and the door opening panel.
Figure 1C:
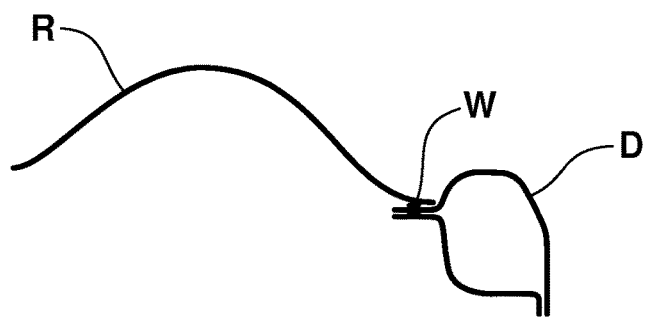
FIG. 1c is a cross-sectional view illustrating the prior art roof panel, the door panel and the weld seam subsequent to a deformation event illustrating buckling of the roof panel adjacent to the weld seam.

Reference is now made to FIGS. 2b and 2c which illustrate some of the beneficial effect provided by the heat-treatment method. As illustrated in FIG. 2b, the heat-treated zone 16 of reduced strength and increased ductility is provided a predetermined distance from the weld seam 14. That predetermined distance may be between, for example, 1 cm and 30 cm. Further the heat-treated zone 16 has a width of between 2 mm and 100 mm. Both the distance between the heat-treated zone 16 in the weld seam 14 and the width of the heat-treated zone 16 are adjusted as necessary to provide the desired in-service structural performance based on experimental testing and/or component testing and/or computer numerical modeling. FIG. 3c illustrates the same cross-section subsequent to a deformation induced in the sheet metal component 12 by a deformation event such as a motor vehicle accident. As illustrated, once the deformation begins in the zone 16, the stresses are distributed within that zone of more ductile material. The more ductile material of the zone 16 absorbs more of the impact energy thereby reducing the likelihood of the cracking of the remainder of roof panel material. Additionally, the selectively heated zone 16 functions to shift the buckling and lifting of the roof panel away from the weld seam 14 thus preserving the weld integrity. In contrast, during impact loading of the untreated roof panel R illustrated in FIGS. 1a-1c, deformation of the roof panel is concentrated at the weld joint or seam W. As a result, the weld seam W of the prior art roof panel R illustrated in FIGS. 1a-1c is subjected to deformation in peel mode. This contrasts sharply with the roof panel 10 which has been subjected to the heat-treatment method described herein to provide the heat-treated zone 16 that shifts the deformation away from the weld seam 14 to the zone 16 thereby also shifting the deformation mode to shear instead of peel. Since a weld is stronger in shear mode than peel mode, it should be appreciated that the roof panel 10 functions to enhance the integrity of the weld.

Reference is now made to the following examples to further illustrate the method.

EXAMPLE 1

In this example, a laser beam is used to selectively heat-treat a linear zone in an aluminum 6022-T4 alloy body sheet. The laser increases the temperature of the zone between 426° C. and 482° C. The heat-treatment reduces the T4 temper of the 6022 body sheet (approximately 100 Vickers hardness) to a fully-annealed temper (approximately 80 Vickers hardness) thereby decreasing the strength of the material by 20% in the heat-treated zone.

EXAMPLE 2

In another embodiment, the laser increases the temperature of the zone between 315° C. and 371° C. The heat-treatment increases the T4 temper of the 6022 body sheet (approximately 100 Vickers hardness) to a harder temper (approximately 120 Vickers hardness) thereby increasing the strength of the material by 20%.

In either of these examples, the width of the zone may be varied depending on the laser beam size and configuration as well as the laser travel speed. The strength and hardness of the zone increases or decreases according to the heat input delivered to the zone. The heat input is controlled using a combination of laser power, laser beam size and configuration, and laser travel speed. Process parameters would vary depending on the material being treated (e.g. (1) precipitate-hardenable 6XXX aluminum, (2) work-hardenable 5XXX aluminum, (3) steel, etc.), specific alloy composition (e.g. 6022 vs. 6111 vs. 6082), proximity of zone to edge of sheet metal component or part being treated (especially for aluminum having high thermal conductivity), the gauge of the material being treated, and the part size and geometry of the material being treated (e.g. is the part a sheet, a component or a subassembly).

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of enhancing in-service structural performance of a sheet metal component incorporating a discontinuity, comprising:
   heat-treating a zone of said sheet metal component a predetermined distance from said discontinuity thereby reducing strength by 15% to 25% of said zone and increasing ductility of said zone; and
   shifting deformation induced in said sheet metal component by a subsequent deformation event away from said discontinuity to said zone.

2. The method of claim 1, wherein said sheet metal component is a 6XXX aluminum alloy, said method further including heating said zone of said sheet metal component to a temperature of between 426° C. and 482° C., or between 315° C. and 371° C.

3. The method of claim 1 including controlling heat input into said zone during heat-treating using a combination of laser power, laser beam size and configuration, and laser travel speed.

4. The method of claim 1, wherein said discontinuity is a weld seam, said method further including shifting deformation mode thereby allowing said weld seam to be loaded in shear instead of peel.

5. A method of enhancing in-service structural performance of a metal motor vehicle roof panel incorporating a discontinuity, comprising:
   heat-treating a zone of said metal motor vehicle roof panel a predetermined distance from said discontinuity thereby reducing strength by 15% to 25% of said zone and increasing ductility of said zone; and
   shifting deformation induced in said metal motor vehicle roof panel by a subsequent deformation event away from said discontinuity to said zone.

6. The method of claim 5, wherein said metal motor vehicle roof panel is a 6XXX aluminum alloy, said method further including heating said zone of said metal motor vehicle roof panel to a temperature of between 426° C. and 482° C. or between 315° C. and 371° C.

7. The method of claim 5 including controlling heat input into said zone during heat-treating using a combination of laser power, laser beam size and configuration, and laser travel speed.

8. The method of claim 5, wherein said discontinuity is a weld seam, said method further including shifting deformation mode thereby allowing said weld seam to be loaded in shear instead of peel.

9. A roof panel for a motor vehicle, comprising:
   a sheet metal component including a discontinuity and a heat-treated zone a predetermined distance from said discontinuity, said heat-treated zone having a strength and a ductility differing from a remaining untreated portion of said sheet metal component whereby deformation induced in said sheet metal component by a subsequent deformation event is shifted away from said discontinuity to said zone,
   wherein said zone runs a full length of said discontinuity.

10. The roof panel of claim 9, wherein said zone has between 15% and 25% less strength than said remaining untreated portion of said sheet metal component.

11. The roof panel of claim 10, wherein said zone has a width of between 2 mm and 100 mm.

12. The roof panel of claim 9, wherein said discontinuity is selected from a group of discontinuities consisting of a weld, a weld heat-affected zone, a feature line, a feature bend, a mechanical fastener joint, a gauge change and a deep draw area that underwent mechanical deformation during manufacture.

13. The roof panel of claim 9, wherein said discontinuity is a weld seam between said roof panel and a door opening panel running along a margin of said sheet metal component.

14. The roof panel of claim 13, wherein said zone runs parallel to said weld seam.

15. The roof panel of claim 14, wherein said zone is spaced from said weld seam a distance of between 1 cm and 30 cm.

* * * * *